United States Patent
Feltman

[15] 3,691,449
[45] Sept. 12, 1972

[54] STATIC INVERTER HAVING AUTOMATIC MEANS FOR PROVIDING A HIGHLY REGULATED A.C. OUTPUT DESPITE CHANGES IN THE INPUT D.C. LEVEL

[72] Inventor: Stanley Feltman, Butler, N.J.
[73] Assignee: Rea International Corporation, Rahway, N.J.
[22] Filed: Feb. 25, 1971
[21] Appl. No.: 118,849

[52] U.S. Cl. ............................... 321/27 MS, 321/19
[51] Int. Cl. .............................................. H02m 7/00
[58] Field of Search ...... 321/27 MS, 19; 323/8, 9, 81, 323/89

[56] References Cited

UNITED STATES PATENTS

| | | | |
|---|---|---|---|
| 3,076,924 | 2/1963 | Manteuffel | 323/89 R |
| 3,297,936 | 1/1967 | Ruch | 321/27 MS |
| 3,378,751 | 4/1968 | Walker | 321/27 MS |
| 3,361,933 | 1/1968 | Hehenkamp | 323/89 R X |
| 3,390,322 | 6/1968 | Rogers | 321/27 MS |
| 3,416,062 | 12/1968 | Bernhard et al. | 321/27 MS |
| 3,189,813 | 6/1965 | Frierdich | 321/27 MS |
| 3,205,424 | 9/1965 | Bates | 321/27 MS |
| 3,247,447 | 4/1966 | Flairty | 321/27 MS |
| 3,317,812 | 5/1967 | Mesenhimer | 321/27 MS |
| 3,343,062 | 9/1967 | Mesenhimer | 321/27 MS |
| 3,346,798 | 10/1967 | Dinger | 321/27 MS |

*Primary Examiner*—William M. Shoop, Jr.
*Attorney*—Ostrolenk, Faber, Gerb & Soffen

[57] ABSTRACT

An inverter for supplying AC power from a DC input. The DC input is employed to operate a pulse generator functioning at a frequency which is twice the desired AC frequency. A pair of bistable multivibrators are continuously triggered by the pulse generator in such a manner that the state of one multivibrator controls the change of state of the remaining multivibrator. The outputs of the bistable multivibrators are employed to operate a pair of driver circuits whose outputs are transformer coupled into a bridge circuit to develop a quasi-square-wave output whose fundamental frequency is the frequency of the desired AC output signal. The quasi-square-wave output is filtered to obtain the AC signal which is monitored by voltage and current sensing circuits to yield a combined output signal representative of the RMS value of the output AC signal. This resultant signal is utilized to establish a reference level developed by a comparator circuit.

The DC input level of the static inverter is employed to charge an integrator circuit which is reset every half-cycle of the output AC frequency. When the output of the integrator exceeds the reference level, a signal is developed to trigger the slave multivibrator to establish a timing relationship between the changeover states of the multivibrators which functions to instantaneously regulate the magnitude of the output signal regardless of changes in the input DC level. This is made possible by use of the integrator circuit which functions so that a constant fundamental frequency content of the quasi-square-wave is held at the desired frequency regardless of changes in the DC input, thus providing instantaneous compensation for variations in the DC line and inherent rejection of conducted audio frequencies on the DC line.

15 Claims, 7 Drawing Figures

FIG. 1.

INVENTOR
STANLEY FELTMAN
BY
Ostrolenk, Faber, Gerb & Soffen
ATTORNEYS

| | | |
|---|---|---|
| S1 CLOSED | S3 CLOSED | VOLTAGE 1-2 = 0 |
| S1 CLOSED | S4 CLOSED | VOLTAGE 1-2 = +DC |
| S2 CLOSED | S4 CLOSED | VOLTAGE 1-2 = 0 |
| S2 CLOSED | S3 CLOSED | VOLTAGE 1-2 = -DC |

STATIC INVERTER HAVING AUTOMATIC MEANS FOR PROVIDING A HIGHLY REGULATED A.C. OUTPUT DESPITE CHANGES IN THE INPUT D.C. LEVEL

The present invention relates to static inverters, and more particularly to a static inverter having a novel regulating circuit for developing a quasi-square-wave output whose fundamental frequency content is the same in magnitude as that of the desired AC output signal regardless of variations in the DC input which further significantly reduces the degree of filtering required on the DC input.

Inverters find widespread use in a number of different fields. Inverters have the capability of accepting DC input power to develop a regulated AC output signal at a regulated frequency.

The static inverter of the present invention has the capability of accepting a nominal DC input of a predetermined level and developing a regulated AC signal having a frequency of 400 Hz, which is especially adapted for operating instruments and navigation equipment aboard aircraft. The total continuous rated output of the inverter is 1,000 VA at any power factor between 0.8 lagging and 0.9 leading. The full rated 1,000 VA may be drawn from the 115 volt AC output (8.7 amperes), or up to 265 VA may be drawn from the 26.5 volt AC output (10 amperes) if the load on the 115 volt AC output is reduced to 635 VA (6.4 amperes) so long as the combined continuous load on the two outputs does not exceed the inverter rating of 1,000 VA. The inverter has a 150 percent overload rating for 5 minutes, during which it is capable of supplying 1,500 VA for power surges when load equipment is turned ON.

The static inverter is comprised of a pulse generator whose output is adapted to simultaneously drive first and second bistable multivibrators, one of which is operated as a slave in that it is capable of changing state only under control of a steering level from the first bistable flip-flop whenever a trigger pulse for shifting the state of the slave flip-flop is received.

The two bistable circuits are employed to drive first and second pairs of drivers which are, in turn, transformer coupled to a power bridge circuit whose output in turn is transformer coupled to a filtering circuit for filtering out the fundamental frequency component. The bridge power circuit functions as a pair of switching means coupled across the output transformer primary whereby the switching phase is controlled by the instantaneous states of the bistable circuits described hereinabove. The phase relationship between the two bistable circuits is controlled by circuitry which contains voltage and current sensing transformers for sensing the voltage and current levels of the output AC signal to develop a signal level which is compared against a reference level to establish a controlled output voltage level (or current level in the case of overload or short circuit).

An integrator circuit, which is reset every half-cycle by the pulse generator, develops a sawtooth waveform whose instantaneous level is compared against a control level from the current or voltage sensing circuits for developing an output trigger signal which controls the length of delay period between the change of state of the master flip-flop and the subsequent change in state of the slave flip-flop for providing instantaneous regulation of the output level of the AC output signal, which control is maintained regardless of fluctuations in the input DC level to the system.

The integrator circuit output is adapted to vary within a predetermined range which is always below the maximum DC input level, in such a manner as to hold the fundamental frequency content in the quasi-square-wave to a constant value developed by the static inverter regardless of the level of the DC input, thereby yielding instantaneous compensation for variations on the DC line and inherent rejection of conducted audio frequencies on the DC line. Means for generating a trigger coincident with the square-wave generator is provided to prevent the inverter from terminating operation in cases where the output level of the integrator fails to reach the required trigger point, due to low input voltage and heavy load.

It is, therefore, one object of the present invention to provide a novel static inverter circuit capable of yielding a highly regulated AC output signal wherein the RMS value of the output signal is constantly monitored to develop a reference signal which is compared against a level representative of the DC input in order to modify the quasi-square-wave output of the inverter power bridge section so as to maintain a constant fundamental frequency content in the quasi-square-wave to provide the desired highly regulated AC signal without the delay necessary with feedback control.

Another object of the present invention is to provide a novel static inverter for use in developing a highly regulated AC signal from a DC input in which the switching of a power bridge section is controlled by a master and slave bistable multivibrator, wherein the time relationship in the switching states of the multivibrators is controlled by comparing the output of a periodically resetting integrating circuit against a reference level representative of the RMS value of the output signal so as to maintain the constant fundamental frequency content in the quasi-square-wave developed by the power bridge section of the inverter.

These as well as other objects of the present invention will become apparent when reading the accompanying description and drawings in which:

FIG. 3 shows a plurality of waveforms useful in explaining the operation of the present invention.

FIG. 4a is a schematic diagram showing an arrangement for use in the circuit of FIG. 1a for balancing output impedance.

FIG. 4b shows a simplified electrical diagram of the circuit of FIG. 4a.

FIG. 5 is a schematic diagram showing a circuit which may be utilized in the inverter of FIG. 1a to control load current in an alternative manner.

Figure 1:
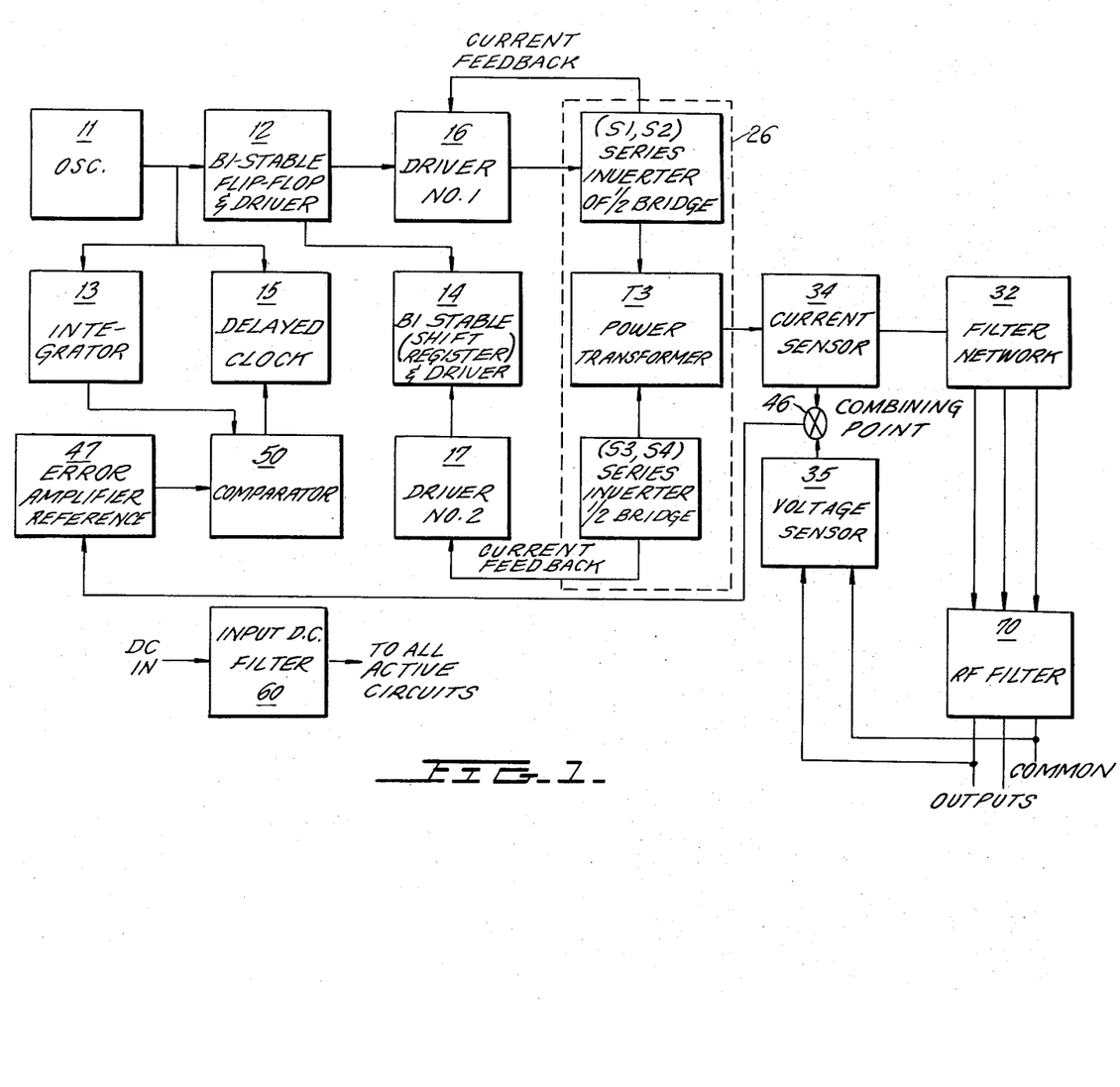
FIG. 1 is a schematic diagram showing a static inverter designed in accordance with the principles of the present invention.
Figure 1A:
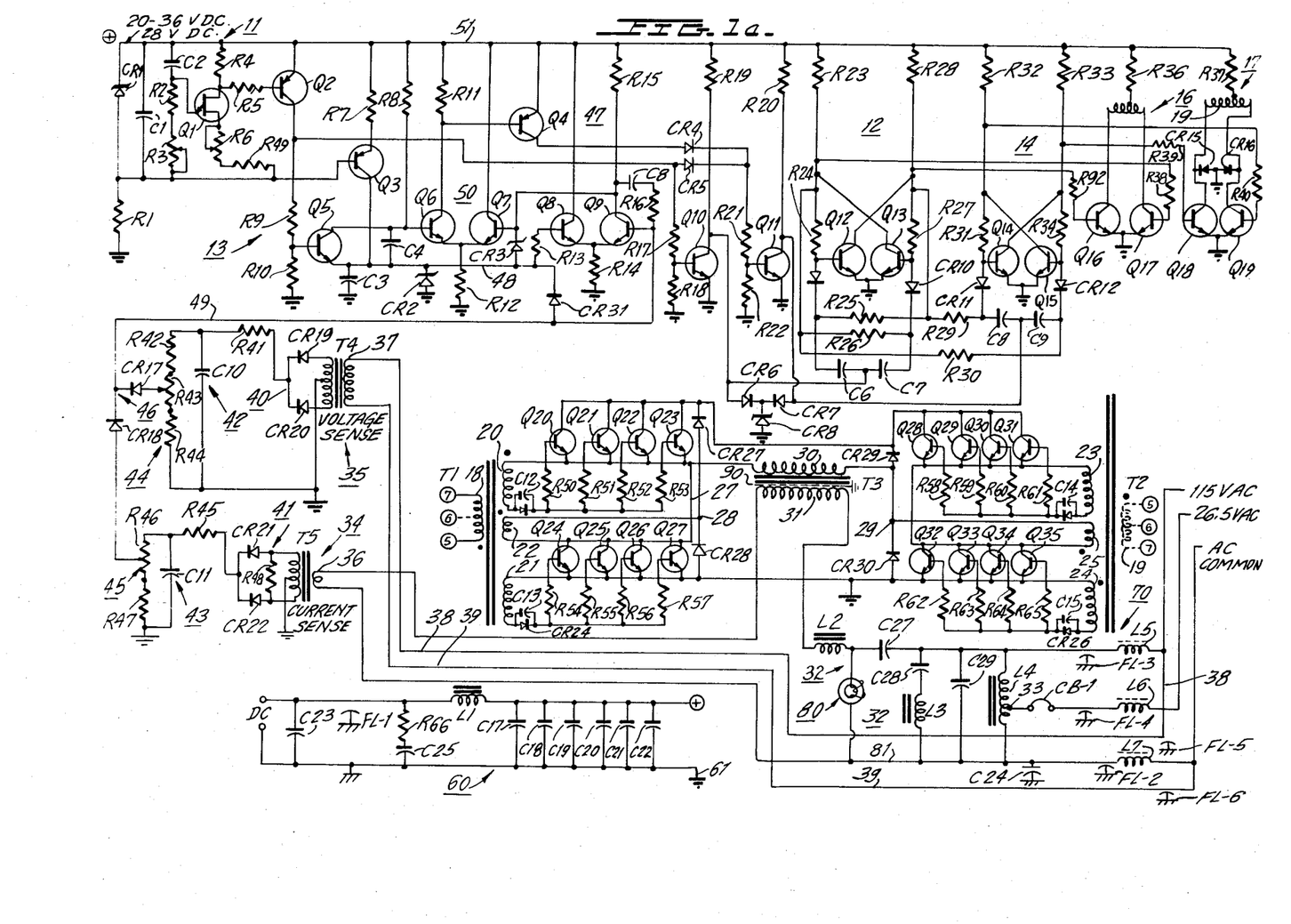
FIG. 1a is a schematic diagram of the static inverter shown in FIG. 1.

Referring to FIGS. 1 and 1a, a static inverter 10 is shown therein, which is comprised of a pulse generator 11 which in one preferred embodiment is an 800 Hz oscillator which, in turn, is comprised of a temperature-compensated "complementary unijunction" transistor Q1 and buffer-amplifier Q2. The oscillator frequency is determined by the time constant of the series connected adjustable resistors R2 and R3 which are further, in turn, connected in series with capacitor C2. Temperature compensation for the oscillator is derived by the ratio of adjustable resistor R6 to the interbase resistance of unijunction Q1.

Unijunction Q1 appears as a high impedance (i.e., is non-conductive) as long as the voltage on C2 is less than a predetermined value which is approximately 60 percent of the interbase voltage. In addition, the emitter of Q1 is back-biased, thereby having a high impedance. When the voltage on C2 reaches a level to start conduction through the emitter, the impedance of the unijunction drops drastically, causing the capacitor C2 to discharge through the emitter-base two junction (i.e., through resistor R4), generating a negative-going pulse across R4. The output of Q2, which is taken from its emitter electrode, is employed to:

A. Trigger the driver transistor Q10 for operation of the flip-flop 12 consisting of transistors Q12 and Q13;
B. Trigger the reset circuit provided in integrator 13, which reset circuit is comprised of transistor Q5;
C. Trigger the shift register 14 comprised of transistor Q14 and Q15, if, and only if, it has not been previously triggered by the delay circuit 15.

The above functions will be more fully described in connection with the overall operation of the inverter.

The emitter of Q2 is coupled through resistor R17 to the base of Q10, which functions as the driver for the bistable multivibrator or flip-flop 12 comprised of cross-coupled transistors Q12 and Q13. One of these transistors is always conducting (i.e., "ON"), while the other is in the non-conducting state (i.e., "OFF"). Conduction of unijunction Q1 develops a negative-going pulse which is applied to the base of Q2, causing its collector to go positive. This positive level is applied to the base of driver Q10, causing its collector to go negative. This negative-going pulse is applied to the common junction between capacitors C6 and C7, whereby the triggering pulse removes the drive from the "ON" transistor, causing the circuit to change state, whereby the conductive states of the transistors Q12 and Q13 are reversed. Reversal of state occurs each time the negative-going pulse is applied to the common junction of capacitors C6 and C7.

Steering of the trigger pulse is accomplished by resistors R25 and R26, thus selecting which of the capacitors C6 and C7 is armed for the next trigger pulse. The steering resistors R25 and R26 each have one end terminal coupled in common with one of the end terminals of capacitors C6 and C7, respectively, with the remaining terminals being coupled to the collector electrodes of transistors Q12 and Q13, respectively. The trigger level is clamped by zener diode CR8, which is coupled to the common junction between capacitors C6 and C7 through diode CR6 so as to maintain a trigger level of approximately 7 volts.

The slave bistable multivibrator 14 is comprised of cross-coupled transistors Q14 and Q15. The common junction of capacitors C8 and C9 is coupled through diodes CR6 and CR7 to the collector of Q10. When a negative-going pulse appears at the junction of C8 and C9, the trigger, if properly armed, takes the drive from the conducting transistor, causing it to turn "OFF" while turning "ON" the remaining transistors. Steering of the trigger pulse is accomplished by resistors R29 and R30, which are coupled to the collectors of the previously described bistable multivibrator 12. The operation of bistable multivibrator 14 is such that triggering of a change of state can occur only if multivibrator 14 is in the state differing from that of bistable multivibrator 12. The bistable circuit 14, therefore, operates as a shift register, in that it will only trigger into the state directed by and similar to the state of the preceding flip-flop 12. Additional trigger pulses appearing at the trigger input are ignored once a change of state has occurred and until the next change of state occurs in bistable multivibrator 12.

The two bistable circuits 12 and 14 are each employed to control the operation of drivers for each half of the inverter bridge. The drivers 16 and 17 for both halves of the inverter bridge are identical, and are driven directly by their associated multivibrator circuits 12 and 14, respectively. Driver circuit 16 is compressed of transistors Q16 and Q17, whose collectors are coupled across the input winding 18 of transformer T1. In a like manner, driver circuit 17 is comprised of transistors Q18 and Q19, whose collectors are coupled across the primary winding 19 of a transformer T2.

The primary winding 18 of transformer T1 is inductively coupled to output windings 20, 21 and 22, while the primary winding 19 of transformer T2 is inductively coupled to the output windings 23, 24 and 25. The output windings 20 and 23 are coupled across the emitter and base electrodes of first and second power transistor groups Q20–Q23 and Q28–Q31, respectively. Output windings 21 and 24 are coupled across the emitter and base electrodes of the transistor groups Q24–Q27 and Q32–Q35, respectively.

Each of the transformers T1 and T2 provides positive current feedback to the respective power stages, thereby minimizing the power required for the driver.

Operation of the inverter bridge is as follows:

Assuming Q16 and Q17 to be "ON" and "OFF," respectively, the voltage is developed across primary winding 18 of transformer T1 which, under no-load conditions, would be twice the input voltage. However, a secondary base-drive winding "sees" a clamped voltage determined by the base circuit of the power section. This causes a voltage drop to occur across resistor R36 in the center-tap of the T1 primary winding 18 with a resultant current flow, which is increased by transformer action to a base current in one-half of the power stage 16. This current is sufficient to turn the power transistors ON, but the drive is limited and cannot provide adequate base current to keep the power transistors saturated at high collector currents. A tertiary winding 22, which is in series with the power transistor collector current path, is used to provide positive current feedback in such a manner as to increase the base current by an amount proportional to the collector current. Thus, current-transformer action is used in the drive circuitry to provide higher drive at higher loads. The turns-ratio of 7:1 in the driver transformer establishes the fixed ratio of base current to collector current (a forces gain of 7) as a variable on top of the low fixed drive initially provided.

The inverter bridge power section 26 consists of 16 power transistors Q20–Q35, four diodes CR26–CR30, and an output transformer T3. The 16 power transistors operate in four groups of four parallel connected transistors arranged in a bridge network. Each series pair of the power transistor groups in the bridge is operated by one driver. The two series sections of the bridge are connected at their centers through the current feedback winding of the driver, to the power transformer T3. For example, the power transistor group Q20–Q23 have their emitters connected in common to conductor 27. The group of power transistors Q24–Q27 have their collectors connected in common to lead 27. The common terminal 28 between diodes CR27 and CR28 (which form half of the bridge) is coupled through tertiary winding 22 to conductor 27. The remaining power transistor groups Q28–Q31 and Q32–Q35 are coupled in a similar fashion.

The four diodes CR27–CR30 are connected as a bridge directly at the transformer T3 such that they are reverse biased across the positive (+) and ground reference terminals DC line. The common terminals between diodes CR27–CR28 and CR29–CR30 are coupled across the primary winding 30 of transformer T3. The diodes carry the reverse currents which would normally try to go through the power transistors during reactive loads. They further provide an inherent protection of the unit against reverse polarity inputs by limiting the reverse voltage to less than 3 volts. During the application of reversed polarity, the input must either be current limited, or protected by a fuse or breaker to protect the eventual damage to these diodes from the very high currents which can flow. The voltage across the power transistors is determined by the phase relationship of the square waves on the two halves of the bridge. When the bridge halves are operated in phase, the voltage is zero volts. When they are operated out of phase, the voltage is a square-wave whose peak is the DC input less transistor saturation drops. In intermediate phase relationships between the two extreme conditions, the waveform is a quasi-square-wave, as is shown in FIG. 3. A simplified schematic diagram of the bridge shown in FIG. 1a is shown in FIG. 2.

Figure 2:
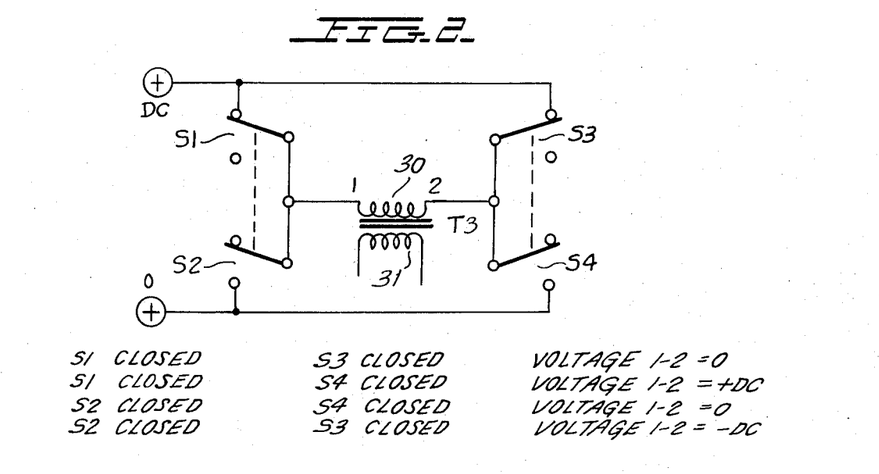
FIG. 2 is a simplified schematic diagram of the inverter power bridge section provided to facilitate an understanding of the operation thereof.
Figures 3, 4A, 4B, 5:
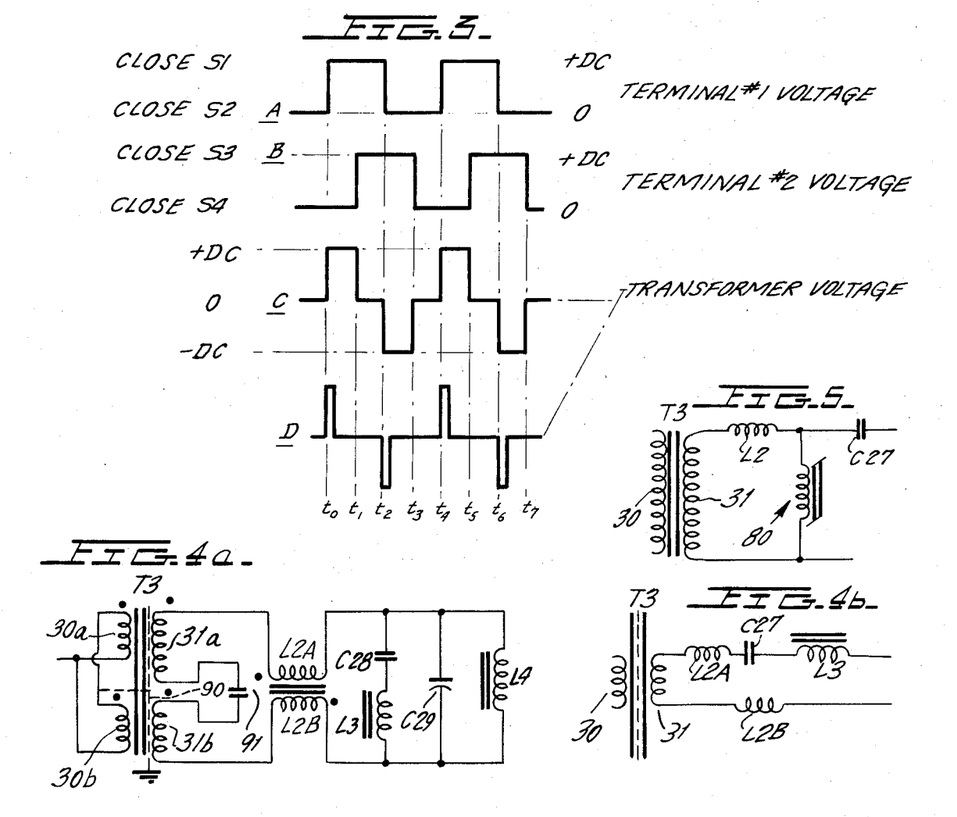

In the simplified schematic of FIG. 2, switches S1 and S2 designate one-half of the bridge, and these switches are driven by driver circuit 16. Switches S3 and S4 represent the other half of the bridge and are driven by driver circuit 17. The conditions of operation are such that one switch, and only one switch, in each half of the bridge is closed at any time. For example, considering FIGS. 1a and 2, let it be assumed that driver circuit 16 functions to turn ON transistor group Q20–Q23. At this time, parallel connected transistors Q24–Q27 will be turned OFF. In the simplified schematic of FIG. 2, this is represented by showing switches S1 and S2 as being Closed and Open, respectively, thus applying positive DC to the left-hand terminal of primary winding 30. Let it further be assumed that driver circuit 17 operates parallel connector transistors Q28–Q31 to be conductive. At this time, parallel connected transistors Q32–Q35 will be in cut-off state. The equivalent to this operation is shown in FIG. 2, whereby switches S3 and S4 will be Closed and Open, respectively. Thus, the voltage across primary winding 30 is zero volts. The change in state of bistable multivibrator 12 causes a change in state of driver circuit 16 which ultimately reverses the conductive states of parallel connected transistor groups Q20–Q23 and Q24–Q27. This is represented in FIG. 2 by having switches S1 and S2 as being 'Open' and 'Closed', respectively. After a predetermined time interval, bistable multivibrator 14, whose operation is steered by bistable circuit 12, changes its state to cause driver circuit 17 to reverse the conductive state of parallel connected transistor groups Q28–Q31 and Q32–Q35, respectively. This is represented in FIG. 2 by having switches S3 and S4 as being 'Open' and 'Closed', respectively. The sequence of changes in state of the switches is shown beneath FIG. 2, while FIG. 3 shows the voltage levels at the left and right-hand terminals (i.e., terminals 1 and 2) of primary winding 30, wherein waveform A represents the voltage level at terminal 1 of winding 30, waveform B represents the voltage level at terminal 2 of winding 30, and waveform C represents the output waveform developed in primary winding 30. Considering FIG. 3 in conjunction with FIGS. 1a and 2, let it be assumed that at time $t_0$, switches S1 and S2 are abruptly changed to the 'Closed' and 'Open' condition, respectively. At this time, switches S3 and S4 are in the 'Open' and 'Closed' position, respectively, whereby the voltage across winding 30 is +DC. At time $t_1$, switches S3 and S4 abruptly change to the 'Closed' and 'Open' states, respectively, developing a zero voltage across winding 30 with the left-hand terminal thereof (terminal 1) being positive as is 2. At time $t_2$, switches S1 and S2 abruptly move to the 'Open' and 'Closed' states, respectively, while switches S3 and S4 remain in the 'Closed' and 'Open' states, whereby the voltage across terminals 1 and 2 of winding 30 is −DC volts. At time $t_3$, switches S3 and S4 are 'Open' and ' Closed', respectively, while switches S1 and S2 remain respectively in the 'Open' and 'Closed' states, whereby the terminals 1 and 2 of winding 30 are both at Zero potential. This state is maintained until time $t_4$ during which switches S1 and S2 abruptly change to the 'Closed' and 'Open' states, respectively, at which time the voltage across winding 30 is −DC. The cycle continues in this manner to continuously develop a quasi-square-wave output in secondary winding 30, as represented by waveform C. The time in which switches S3 and S4 go to the 'Open' and 'Closed' states, respectively, after switches S1 and S2 have gone to the 'Closed' and 'Open' states, respectively (i.e., time interval $t_1-t_0$), may be varied in a manner to be more fully described within a range from 15° after time $t_0$ to a maximum of 180° (i.e., up to time $t_2$). The minimum delay interval will result in a generation of a waveform D while the maximum delay interval (180°) will result in full output (i.e., a square wave reference level). The manner in which switch timing is controlled will be more fully described.

The output filter 32 of the static inverter develops a sine wave from the quasi-square-wave output of the power transformer T3. A series-tuned 400 Hz filter comprised of inductor L2 and capacitor C27 is connected to one terminal of output winding 31 and is followed by a parallel-tuned 400 Hz filter comprised of conductor L4 and capacitor C29. A series-tuned third harmonic trap, comprised of capacitor C28 and inductor L3, is coupled in parallel across capacitor C29. The inductor L4 of the parallel-tuned filter is tapped at 33 to provide a 26.5 volt AC output by auto-transformer action. The capacitors provided in the filter circuit are selected to provide a low temperature coefficient and very low dissipation factor at the output frequency (400 Hz). The series-tuned filter is most effective at higher loads, whereas the parallel-tuned filter is most effective at light loads. At full load the stored energy in both filters is about equal, whereas at no load, there is no stored energy in the series filter and roughly 750 VA in the parallel filter. The energy in the parallel filter is constant regardless of load, whereas the energy in the series filter is load-dependent. Because of the changing energy with variations in the load, the "Q" of the filter remains high for all loads, keeping the distortion low. The unfiltered output waveform distortion is mostly third harmonic, and the series trap comprised of components L3 and C28 coupled across the parallel-tuned output filter reduces this to minimal level.

Automatic regulation of the output signal is accomplished through a circuit loop comprised of current and voltage sensor circuits 34 and 35, respectively. Current sensor 34 is comprised of a current transformer T5, whose primary winding 36 is connected in series between secondary winding 31 of power transformer T3 and the output filter network 32 to sense actual inverter load current. Voltage sensing circuit 35 includes transformer T4, whose primary winding 37 is connected across the output of the filter network through leads 38 and 39 to sense voltage. The outputs of these transformers are rectified by circuits 40 and 41, respectively, and filtered by R-C networks 42 and 43, respectively, to provide outputs approximating true RMS regardless of distortion. Potentiometers 44 and 45 are respectively provided to attenuate the signals to approximately a 7 volt level, after which the signals are mixed or combined by OR circuit 46, comprised of diodes CR17 and CR18 whose cathode terminals are connected in common to the base electrode of transistor Q9. The output of summing circuit 46 is the higher of the two signals, thus providing automatic crossover between voltage regulation and current regulation whereby the regulator does not know which of the two sensor circuits it is being controlled by.

Transistor Q9 together with transistor Q8 form a differential amplifier employed as an error amplifier circuit 47 for continuously comparing a reference voltage level against the sensed signal (i.e., voltage or current).

The reference voltage level is developed by zener diode CR2 connected between ground and conductor 48. Zener CR2 is driven by current generator Q3 to eliminate variations in zener current due to DC input variations. This reference voltage is fed into one side of differential amplifier 47 through resistor R13, which is coupled to the base of transistor Q8. The sensed signal is coupled from the output of OR circuit 46 through line 49 to the base of transistor Q9. Feedback loop roll-off is also inserted in this stage (capacitor C5 and resistor R16) and coupled in series between the emitter and collector of Q9 to provide for control loop stability. When the input signal applied to the base of Q9 is below the reference level, Q9 conducts low current, causing its collector voltage to increase. Conversely, if the output is higher than the reference, Q9 conducts more current, causing its collector voltage to decrease due to the drop across R15. The output at the collector of Q9 is fed to the comparator circuit 50 to provide for phase control of the delayed driver 15.

Comparator circuit 50 is a differential amplifier similar to the error amplifier circuit 47, and is comprised of transistors Q6 and Q7 which compares the instantaneous level of a sawtooth waveform developed by the integrator circuit 13 with the output of error amplifier 47. Whenever the voltage of the sawtooth signal exceeds the output of error amplifier 47, the delayed clock circuit 15 comprised of transistor Q4, which is coupled to the collector of Q6, is turned ON by Q6 to trigger shift register 14 through diode CR4 coupled between the Q4 emitter and the base of transistor Q11, whose collector is coupled to the trigger input of bistable multivibrator 14 consisting of Q15 and Q16. At very low line voltage and with a heavy load, the integrator voltage may never reach the trigger point. To prevent the inverter from terminating its operation, a trigger is derived from the output of the unijunction oscillator 11 and is taken from the Q2 emitter and applied to the base of Q11 by diode CR5 and resistor R21. The trigger, which is coincident with the pulses of the unijunction oscillator is injected to cause the shift register to trigger. If Q4 has been turned ON, the false trigger is ignored, since Q4 remains conductive until the integrator has been reset by the main clock.

The integrator circuit 13 is comprised of series connected resistor R8 and capacitor C4 and transistor Q5 which is connected in parallel across the terminals of C4. C4 is charged at a rate determined by the input DC level appearing at line 51 less the value of the reference level established by the zener diode CR2. Analysis of this indicates that for a fixed input from the error amplifier 47 the crossover point (trigger) will vary in a manner which holds a constant fundamental frequency content (400 Hz) in the quasi-square-wave regardless of the DC input. This provides for instantaneous compensation for variations on the DC line and for inherent rejection of conducted audio frequencies on the DC line.

The unijunction oscillator fires 800 times per second, causing transistor Q5 to be triggered ON at the same rate so as to discharge C4, thereby causing the integrator to be reset for each half cycle of the AC output.

Filtering is provided on both inputs and outputs to the inverter. The DC input line is fed through an RF bypass feed through capacitor C23 and then into an audio filter 60 to prevent most of the 800 Hz ripple current from reflecting to the DC bus, as well as keeping switching spikes from coupling out. A negative DC line is connected to the ground plane (i.e., case ground) 61.

Feed-through capacitors FL-3, FL-4 and FL-2 and chokes L5, L6 and L7 are also respectively used in the AC common, 26.5 volt AC and 115 volt AC outputs to prevent switching spikes from being transmitted outside the unit by conduction on the power lines.

In summary, the operation of the static inverter is as follows:

An 800 Hz pulse is developed by unijunction oscillator 11. This output is utilized to simultaneously: reset integrator circuit 13, trigger bistable flip-flop 12 and, when necessary, trigger bistable flip-flop 14. Flip-flop 14 may be switched only toward the same state as flip-flop 12 under the control of the steering resistors R29 and R30.

The outputs of the two bistable circuits are employed to control the conductive states of driver circuits 16 and 17 so that only one of the power driver transistors in each of these driver circuits is conductive at any given time. Driver circuits 16 and 17 are inductively coupled to an inverter power bridge network through transformer means T1 and T2 to alternately switch ON one of two groups of parallel connected power transistors. The outputs of the power transistor groups are coupled into a bridge circuit for sequentially developing zero voltage, DC voltage of a first polarity, zero voltage, and finally DC voltage of the opposite polarity in that sequential fashion across the primary winding of output transformer T3. The secondary winding is caused to develop a quasi-square-wave whose fundamental frequency component is the frequency of the AC output signal. The square wave is filtered to pass a fundamental frequency and to block the harmonic frequencies. The output signal is constantly monitored as to its instantaneous current and voltage state to develop a pair of sensing signals which are ORed together to develop a voltage regulation or current regulation signal, depending upon which of the two levels is greater at any given instant. This resultant signal is compared against a reference level established by zener CR2 to develop a positive or negative-going signal, depending upon whether the regulation signal is greater or lesser than the reference level. This resultant signal is then compared against the level of a sawtooth signal developed by the integrator circuit 13 to turn ON a delayed trigger timing circuit (Q4) whenever the sawtooth waveform exceeds the value of the reference level signal. The turn-on time of the delayed clock circuit controls the relative delay between switching of the master flip-flop 12 and the slave flip-flop 14 so that switching further occurs only when two flip-flops are in different states. When line voltage exceeds its nominal value, the sawtooth waveform will reach the level whereby it will exceed the reference level more rapidly than that time required to exceed the reference level with the DC input at its nominal value, the result of which is the reduction in pulse width of the positive and negative-going pulses which make up waveform C. Conversely, with the decrease in input level from the nominal DC level, the sawtooth reaches its peak value at a slower rate, causing an increase in the pulse width of each of the positive and negative-going pulses in output waveform C. However, regardless of pulse width, the fundamental frequency content of the quasi-square-wave remains the same (i.e., 400 Hz., 115 VAC).

FIG. 4a shows a balanced impedance arrangement which may be substituted for that shown in FIG. 1a so as to significantly improve and evenly distribute capacitive decoupling and signal attenuation of unwanted radio frequencies.

As shown in FIG. 4a, transformer T-3 is provided with a copper sheet 90, positioned between the primary and secondary windings and connected to ground or reference potential for purposes of capacitively decoupling the primary and secondary windings. This copper sheet is designated by numeral 90, as is shown in FIG. 4a. The primary winding 30 comprises a pair of parallel connected windings 30a and 30b. The secondary winding in FIG. 4a comprises first and second winding halves 31a and 31b, whose inner terminals are coupled to capacitor 91 so as to be connected in series with the secondary winding halves. Inductor L-2, shown in FIG. 1a, is replaced in FIG. 4a by a single inductor having coils L-2A and L-2B, each having half the inductance value of the inductor L-2 of FIG. 1a and each being coupled to the outer terminals of secondary winding portions 31a and 31b. The remaining circuitry of FIG. 1a is unchanged, and has therefore been eliminated from FIG. 4a for purposes of simplicity. FIG. 4b shows the electrical equivalent of FIG. 4a.

With the arrangement of FIG. 1a, it has been found that the copper sheet 90 (also shown in FIG. 1a) is more effective as to its capacitive decoupling characteristic on the high side of the transformer (i.e., on the side of the secondary winding 31 coupled to inductor L-2) than it is on the low side (i.e., the side of secondary winding 31 connected to ground or reference potential through the primary winding 36 of the current sensing transformer 34). By coupling capacitor 91 between secondary winding portions 31a and 31b (of equal turns) and by dividing inductor L-2 of FIG. 1a into inductor halves L-2A and L-2B, as shown in FIG. 4a, the capacitive decoupling effect of copper sheet 90 is fully balanced and attenuation of unwanted frequencies is found to increase by as much as 20 db.

FIG. 1a shows still another arrangement in which the inverter may deliver to a load connected thereto short circuit current of a value which is two to three times normal current. This result is achieved through the use of saturable reactor 80, having a first terminal coupled to the common connection between inductor L-2 and capacitor C-27 and having a second terminal coupled to ground or reference potential represented by lead 81.

The nature of the saturable reactor is such that at a predetermined current the saturable reactor 80 will saturate. As load current increases transformer T-3 sees a normal output condition, but the stored energy in capacitor C27 is such as to provide an increase in inverter current fed to a load utilization device of as much as 200–300 percent normal inverter output current, thereby providing a high fault current clearing capacity for the circuit. The use of a saturable reactor makes it possible to eliminate the need for the current control loop consisting of T5 and its associated components. The actual circuit is shown in FIG. 5, eliminating the current control circuitry.

It can be seen from the foregoing description that the present invention provides a small, solid state (static) inverter for developing a highly regulated AC input level regardless of fluctuation in the level of the DC input signal.

Although this invention has been described with respect to particular embodiments, it should be understood that many variations and modifications will now be obvious to those skilled in the art, and therefore the scope of this invention is limited not by the specific disclosure herein but only by the appended claims.

The embodiments of the invention in which an exclusive privilege or property is claimed are defined as follows:

1. A d-c to a-c converter comprising:
   a pulse generator;
   first and second bistable circuits each having first and second outputs;

first trigger means responsive to said pulse generator for continuously reversing the state of said first bistable circuit;

second trigger means for reversing the state of said second bistable circuit;

steering means coupled between said first and second bistable circuits for preventing a reversal in the state of said second bistable circuit when the first and second outputs of said first and second bistable circuits are in the same state;

a d-c source having first and second output terminals;

a transformer having input and output windings;

first switch means responsive to the state of said first bistable circuit for alternately coupling the first and second output terminals of said d-c source to one terminal of said input winding;

second switch means responsive to the state of said second bistable circuit for alternately coupling the first and second output terminals of said d-c source to the remaining terminal of said input winding;

first filter means coupled across said output winding for passing only the fundamental frequency content of the signal developed by said output winding;

voltage sensing means coupled across said filter means for developing a signal representing the output voltage of the converter;

current sensing means coupled to said output winding for developing a signal representative of the output current of the converter;

means for combining the outputs of said current and voltage sensing means to provide an output which is the higher one of the outputs of said current and voltage sensing means;

means coupled to said d-c source for developing a reference level less than the maximum level of said d-c source;

means coupled to said square-wave generator for generating a sawtooth waveform of the same frequency as said squarewave generator;

comparison means coupled to said combining means and said reference level generating means for generating a trigger signal when the level of said square-wave generating means exceeds said reference level;

said second means being coupled to said comparison means for triggering the switching of said second bistable circuit whereby said second bistable circuit is switched a predetermined time after the switching of said first bistable circuit dependent upon the level of said combining means.

2. The device of claim 1 further comprising means coupled between said pulse generator and said second bistable circuit for limiting the maximum delay in switching said second bistable circuit after said first bistable circuit has been switched.

3. The device of claim 1 wherein said pulse generator is adapted to generate a pulse train output which is twice the frequency of the desired a-c output.

4. The device of claim 1 wherein said first switching means is comprised of first and second diodes connected in series across the first and second output terminals of said d-c source;

second transformer means having an input and first and second output windings;

first and second transistors respectively controlled by the first and second outputs of said first bistable circuit and having their outputs coupled across the second transformer input winding;

first power transistor means each having a control electrode and output electrodes coupled between one of said d-c source output terminals and the common terminal of said first and second diodes;

second power transistor means coupled between the remaining one of said d-c source output terminals and the common terminal of said first and second diodes;

said second transformer first and second output windings respectively coupled to the control electrodes of said first and second power transistors for alternately energizing said first and second power transistors;

the common terminal of said first and second diodes being coupled to one terminal of the first transformer input winding.

5. The device of claim 4 wherein said second switching means is comprised of third and fourth diodes connected in series across the first and second output terminals of said d-c source;

third transformer means having an input and first and second output windings;

third and fourth transistors respectively controlled by the first and second outputs of said second bistable circuit and having their outputs coupled across the third transformer input winding;

third power transistor means each having a control electrode and output electrodes coupled between one of said d-c source output terminals and the common terminal of said third and fourth diodes;

fourth power transistor means coupled between the remaining one of said d-c source output terminals and the common terminal of said third and fourth diodes;

said fourth transformer first and second output windings respectively coupled to the control electrodes of said third and fourth power transistors for alternately energizing said third and fourth power transistors;

the common terminal of said third and fourth diodes being coupled to the remaining terminal of the first transformer input winding.

6. The device of claim 1 wherein said filter means further comprises means for trapping the third harmonic component of the signal developed by said first transformer output winding to prevent the presence of any third harmonic component in the a-c output signal of the converter.

7. The device of claim 1 wherein said sawtooth wave generator comprises a series connected capacitor and resistor coupled in series with said reference level generating means and being connected across the terminals of said d-c source;

means coupled to said pulse generator for discharging said capacitor once per half cycle of said a-c output signal.

8. The device of claim 1 wherein said comparison means is comprised of a first difference amplifier having a first input coupled to said summing means, a second input coupled to said reference level and an output;

a second difference amplifier having a first input coupled to the output of said first difference amplifier, a second input coupled to said sawtooth-wave generator and an output coupled to said second trigger means.

9. The device of claim 4 wherein said second transformer means further comprises a third output winding coupled between the common terminal of said first and second diodes and said first and second power transistors for providing positive feedback to the conducting power transistor for increasing the base drive current of the conducting power transistor by an amount proportional to the output current of the conducting transistor.

10. The device of claim 5 wherein said third transformer means further comprises a third output winding coupled between the common terminal of said third and fourth diodes and said third and fourth power transistors for providing positive feedback to the conducting power transistor for increasing the control current of the conducting power transistor by an amount proportional to the output current of the conducting transistor.

11. Circuit means for providing high output for a load connected thereto comprising:
 a transformer having input and output windings;
 means coupled to said input winding for sequentially and repetitively developing a positive going square wave signal, a zero level signal, a negative going square wave signal and a zero level signal whereby said secondary winding develops a quasi-square wave signal;
 output means for coupling said circuit means to a load;
 filter means coupled between said transformer output winding and said output means for attenuating signals of unwanted radio frequencies contained in the output signal developed by said output winding;
 saturable reactor means coupled across said output winding and adapted to saturate at a predetermined current value for limiting normal output current supplied by said output winding to said output means and being adapted to store energy sufficient to supply said output means with greater than normal output current without causing said transformer means to increase the current it supplies to said output means.

12. Means for balancing the output of a circuit providing an output to a load comprising:
 a transformer having core windings;
 primary and secondary windings provided on said core whereby said core enhances the inductive coupling between primary and secondary windings;
 a conductive sheet positioned between said primary and secondary windings for preventing any capacitive coupling between said primary and secondary windings;
 said secondary winding comprising first and second winding portions each having first and second terminals;
 A capacitor coupled between the first terminal of said first winding portion and the first terminal of said second winding portion;
 a first inductor having one terminal coupled to the second terminal of said first winding portion and a second inductor having one terminal coupled to the second terminal of said second winding portion, said inductors sharing a common core;
 output means for coupling the output of said circuit to a load;
 the remaining terminals of said first and second inductors being coupled to said output means.

13. The means of claim 12 wherein the first and second winding portions have an equal number of turns.

14. The device of claim 12 wherein said inductances of said first and second inductors are of equal value.

15. Circuit means for providing high output for a load connected thereto comprising:
 a transformer having input and output windings;
 means coupled to said input winding for coupling a varying signal thereto causing said secondary winding to develop a quasi-square wave signal;
 output means for coupling said circuit means to a load;
 filter means coupled between said transformer output winding and said output means for attenuating signals of unwanted frequencies contained in the output signal developed by said output winding;
 saturable reactor means coupled across said output winding and adapted to saturate at a predetermined current value for limiting normal output current supplied by said output winding to said output means and being adapted to store energy sufficient to supply said output means with greater than normal output current without causing said transformer means to increase the current it supplies to said output means.

* * * * *